United States Patent
Tate, Jr. et al.

(10) Patent No.: US 9,291,468 B2
(45) Date of Patent: Mar. 22, 2016

(54) ROUTE PLANNING SYSTEM AND METHOD

(75) Inventors: Edward D. Tate, Jr., Grand Blanc, MI (US); Michael O. Harpster, Jr., Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1846 days.

(21) Appl. No.: 12/435,710

(22) Filed: May 5, 2009

(65) Prior Publication Data

US 2010/0286909 A1    Nov. 11, 2010

(51) Int. Cl.
*G01C 21/34* (2006.01)

(52) U.S. Cl.
CPC ...... *G01C 21/3469* (2013.01); *B60W 2550/402* (2013.01)

(58) Field of Classification Search
USPC ........................................................ 701/209
See application file for complete search history.

(56) References Cited

U.S. PATENT DOCUMENTS 5,559,707 A * 9/1996 DeLorme et al. ............. 701/200
6,321,158 B1 * 11/2001 DeLorme et al. ............. 701/201

OTHER PUBLICATIONS

Salman et al., Predictive Energy Management Strategies for Hybrid Vehicles, IEEE, 2005.*

* cited by examiner

*Primary Examiner* — Lena Najarian
(74) *Attorney, Agent, or Firm* — Quinn Law Group, PLLC

(57) ABSTRACT

A system for selecting a route from a starting location to a predetermined destination includes a vehicle having a battery, a data storage medium, and a processor. The data storage medium stores a map database that describes a road network defining a plurality of possible routes from the starting location to the predetermined destination. The processor is configured to determine whether any of the possible routes belong to a set of routes the vehicle can complete using only the energy in the battery. The processor is configured to select, of the routes belonging to the set, that route having an optimized value for the attribute.

14 Claims, 4 Drawing Sheets

| ROAD SEGMENT | TIME (SECONDS) | ENERGY (KILOWATT-HOURS) |
|---|---|---|
| 66A | 655 | 2.6 |
| 66B | 655 | 2.6 |
| 66C | 1028 | 2.1 |
| 66D | 800 | 2 |
| 66E | 655 | 2.6 |
| 66F | 800 | 2 |
| 66G | 800 | 2 |
| 66H | 1028 | 2.1 |
| 66I | 800 | 2 |
| 66J | 655 | 2.6 |
| 66K | 1028 | 2.4 |
| 66L | 1028 | 2.4 |
| 66M | 1285 | 7.5 |
| 66N | 360 | 1 |
| 66P | 565 | 3.5 |
| 66Q | 1285 | 7.5 |

|     | N1  | N2  | N3  | N4  | N5  | N6  | N7  | N8  | N9  | N10 |
| --- | --- | --- | --- | --- | --- | --- | --- | --- | --- | --- |
| N1  | -   | 66A | -   | 66M | 66C | -   | -   | -   | -   | -   |
| N2  | 66A | -   | 66B | -   | -   | 66D | -   | -   | -   | -   |
| N3  | -   | 66B | -   | 66N | -   | -   | 66E | -   | -   | -   |
| N4  | 66M | -   | 66N | -   | -   | -   | 66P | -   | -   | 66Q |
| N5  | 66C | -   | -   | -   | -   | 66F | -   | 66I | -   | -   |
| N6  | -   | 66D | -   | -   | 66F | -   | 66G | -   | 66I | -   |
| N7  | -   | -   | 66E | 66P | -   | 66G | -   | -   | -   | 66J |
| N8  | -   | -   | -   | -   | 66H | -   | -   | -   | 66K | -   |
| N9  | -   | -   | -   | -   | -   | 66I | -   | 66  | -   | 66L |
| N10 | -   | -   | -   | 66Q | -   | -   | 66J | -   | 66L | -   |

ROUTE PLANNING SYSTEM AND METHOD

TECHNICAL FIELD

This invention relates to vehicle navigation systems.

BACKGROUND OF THE INVENTION

A hybrid powertrain for a vehicle includes two power sources that are operatively connectable to a drive wheel to propel the vehicle. Typically, one of the power sources is an engine and another of the power sources is an electric motor. The engine converts the chemical energy in fuel to mechanical energy through the process of combustion. The electric motor converts electrical energy from a battery to mechanical energy. The battery may be recharged by a generator driven by the engine, an offboard electrical power source (such as the electric grid), etc. The generator may also transmit electrical energy directly to the electric motor.

In a series hybrid-electric powertrain, there is no mechanical connection from the engine to the drive wheel; the engine is operatively connected to the drive wheel via the generator and the electric motor. In a parallel hybrid-electric powertrain, the engine is mechanically connectable to the drive wheel, such as via a transmission and differential.

SUMMARY OF THE INVENTION

A system for selecting a route from a starting location to a predetermined destination includes a vehicle having a battery, a data storage medium, and a processor. The data storage medium stores a map database that describes a road network. The road network includes route segments that, in various combinations, define a plurality of possible routes from the starting location to the predetermined destination. The route segments are characterized by an attribute and an energy cost. The map database includes, for each of the route segments, a respective value for the attribute.

The processor is operatively connected to the battery to determine the amount of available energy stored in the battery. The processor is also operatively connected to the storage medium and configured to selectively access the map database. The processor is configured to determine whether any of the possible routes belong to a set of routes from the starting location to the predetermined destination having a total estimated energy cost that is sufficiently low such that the vehicle can complete any one of the routes in the set using only the energy in the battery. The processor is configured to select, of the routes belonging to the set, that route having an optimized value for the attribute.

A corresponding method of determining an optimized route for a vehicle to travel from a starting location to a predetermined destination is also provided. The method includes receiving the starting location, receiving the predetermined destination, and determining the amount of available energy in a battery in the vehicle. The method also includes accessing a map database that describes a road network having route segments that, in various combinations, define a plurality of possible routes from the starting location to the predetermined destination. The route segments are characterized by an attribute and an energy cost. The map database includes, for each of the route segments, a respective value for the attribute.

The method further includes determining whether any of the possible routes belong to a set of routes from the starting location to the predetermined destination having a total estimated energy cost that is sufficiently low such that the vehicle can complete any one of the routes in the set using only the energy in the battery, and determining, of the possible routes belonging to the set, determining that route having an optimized value for the attribute.

The system and method provided herein thus provide the optimized route that a vehicle can complete using only the energy in the battery. When used with a battery-electric vehicle, the system and method determine the best route that is within the range of the vehicle. When used with a hybrid-electric vehicle, the system and method determine the best route that the vehicle can complete without using the engine, and thereby minimize or eliminate fuel consumption.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
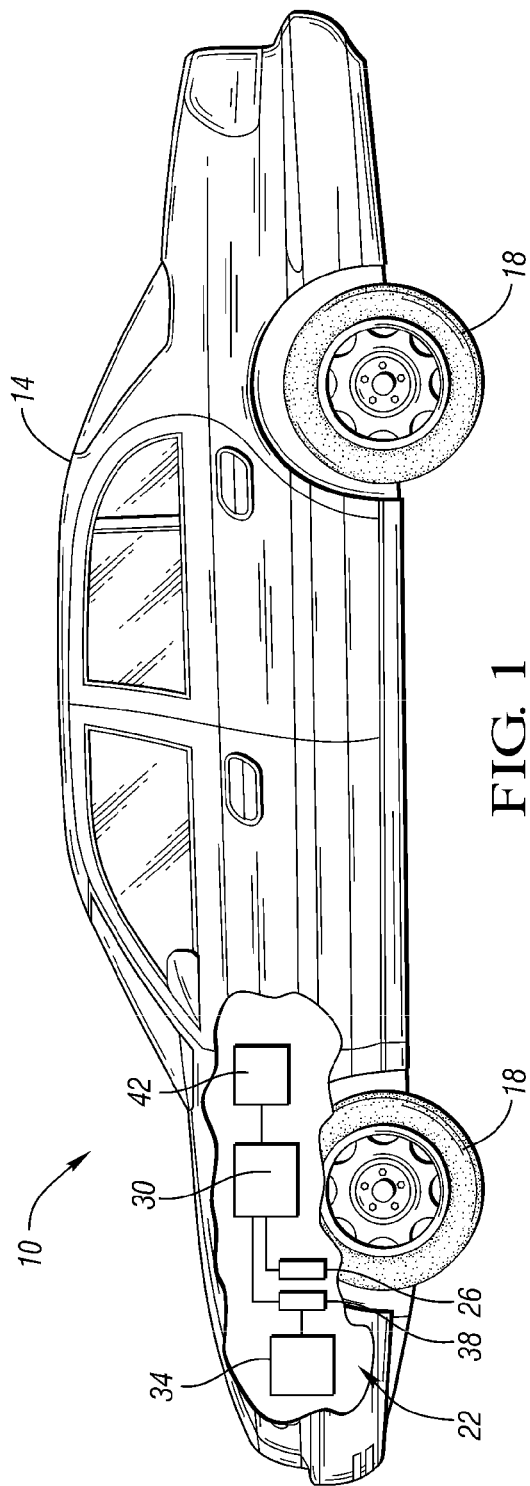
FIG. 1 is a schematic, elevational, partial cutaway view of a vehicle having a hybrid-electric powertrain and a navigation system.

Referring to FIG. 1, an automotive vehicle 10 includes a vehicle body 14. A plurality of wheels 18 are rotatably mounted with respect to the body 14 and support the body 14 on the ground, as understood by those skilled in the art. The vehicle 10 also includes a powertrain 22. In the embodiment depicted, the powertrain 22 includes an electric motor 26 having a rotor (not shown) operatively connected to at least one of the wheels 18 to transfer torque thereto for propelling the vehicle 10. The powertrain 22 also includes a battery 30 operatively connected to the motor 26 and configured to selectively supply electrical energy to the motor 26. Those skilled in the art will recognize a variety of battery configurations that may be employed within the scope of the claimed invention, such as lead-acid, lithium-ion, nickel-cadmium, nickel-metal hydride, etc. As used herein, a "battery" may include multiple batteries or cells operatively interconnected, e.g., in series or in parallel, to supply electrical energy.

The powertrain 22 in the embodiment depicted further includes an engine 34 and a generator 38. The engine 34 is operatively connected to the generator 38 to drive the generator 38, which causes the generator 38 to generate electrical energy, as understood by those skilled in the art. The generator 38 is operatively connected to the battery 30 to supply electrical energy thereto for recharging the battery 30. The generator 38 is also operatively connected to the motor 26 to selectively supply electrical energy thereto. A powertrain control module (not shown) controls the flow of electrical energy between the generator 38, the motor 26, and the battery 30, depending on the driver power command, the state of charge of the battery 30, etc.

The powertrain 22 in the embodiment depicted is a series hybrid-electric powertrain. Other hybrid-electric powertrain configurations, such as parallel hybrid-electric powertrains, may be employed within the scope of the claimed invention. In the embodiment depicted, the powertrain 22 is configured such that the engine 34 only operates when the state of charge of the battery 30 is less than a predetermined amount. More specifically, the powertrain 22 is configured to operate using only the energy stored in the battery 30 until the amount of energy in the battery 30 available to propel the vehicle 10 is below a predetermined amount, at which time the powertrain control module causes the engine 34 to operate, which in turn causes the generator 38 to recharge the battery 30 and to transmit electrical energy to the motor 26 to propel the vehicle.

In an exemplary embodiment, the powertrain 22 is a plug-in hybrid-electric powertrain, in which the battery 30 is rechargeable by an offboard electrical source (such as the electric grid).

Figure 2:
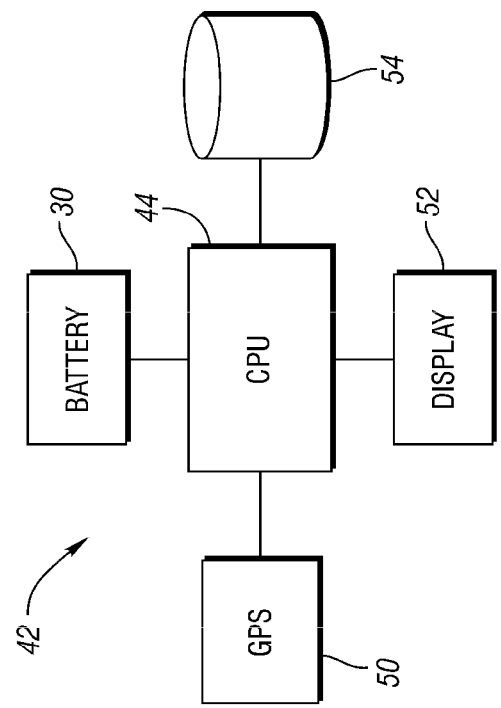
FIG. 2 is a schematic view of the navigation system of FIG. 1.

The vehicle 10 also includes a navigation system 42 mounted with respect to the vehicle body 14. Referring to FIG. 2, wherein like reference numbers refer to like components from FIG. 1, the navigation system 42 includes a processor 44, a vehicle location detection device which, in the embodiment depicted, is a global positioning system (GPS) receiver 50, a touch-screen display 52, and a data storage medium 54.

Figure 3:
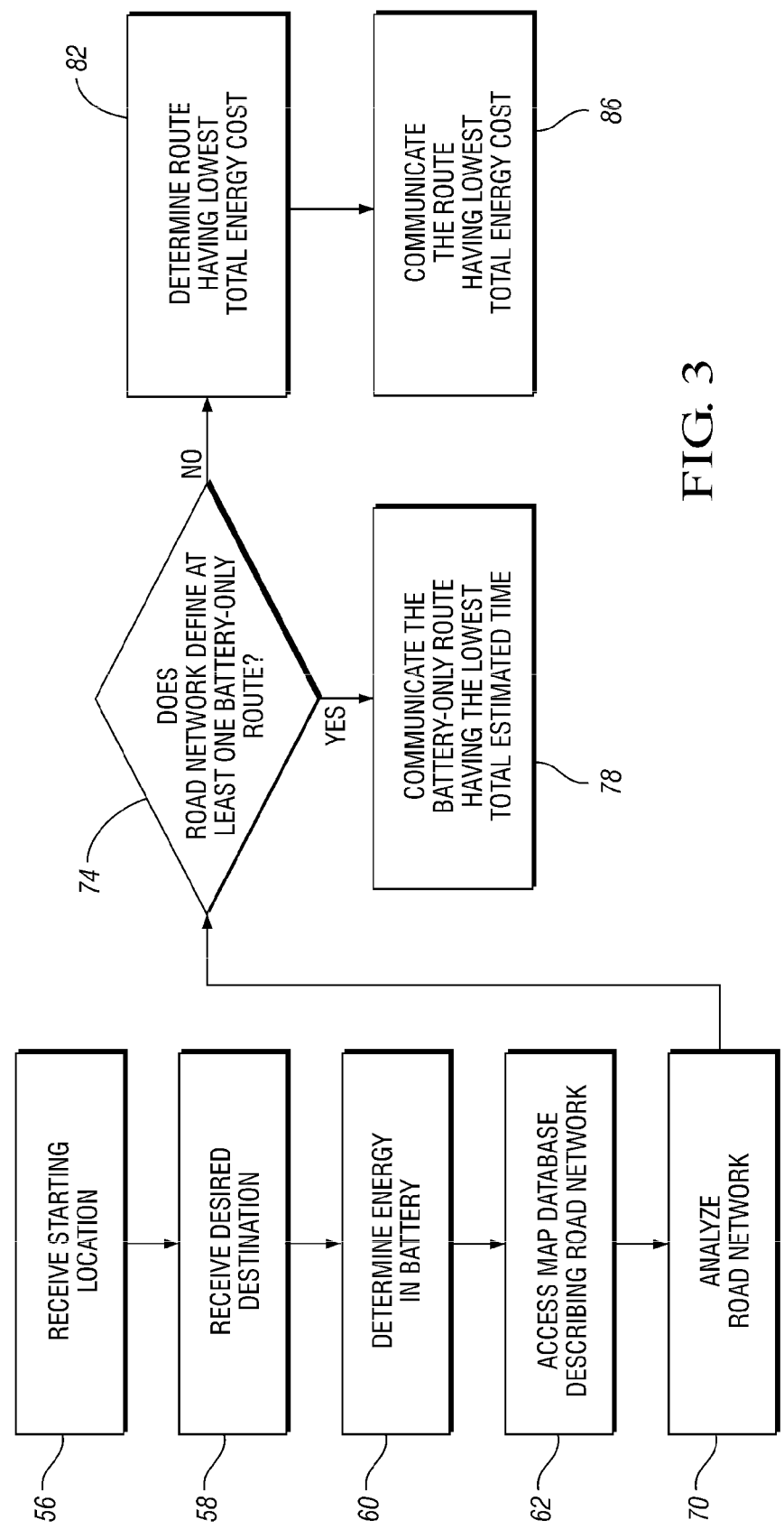
FIG. 3 is a flow chart depiction of a method and exemplary control logic for the navigation system of FIGS. 1 and 2.

FIG. 3 schematically depicts a method of determining a route, and represents an exemplary control logic for the processor 44 of the navigation system. Referring to FIGS. 2 and 3, the processor 44 receives a starting location at step 56. As understood by those skilled in the art, the GPS receiver 50 is configured to determine the geographic location of the vehicle 10 based on satellite signals. The GPS receiver 50 is operatively connected to the processor 44 and is configured to communicate the location of the vehicle 10 to the processor 44. The location of the vehicle 10, as transmitted by the GPS receiver 50 to the processor 44, is typically the starting location received at step 56. Alternatively, and within the scope of the claimed invention, the processor 44 may receive the starting location from a vehicle operator via an input device or user interface, such as the touch-screen display 52.

The processor 44 receives a desired destination at step 58. In the embodiment depicted, the touch-screen display 52 is an input device that functions as an interface through which a driver of the vehicle may enter and transmit to the processor 44 the desired destination. Those skilled in the art will recognize a variety of other input devices that may be employed within the scope of the claimed invention, such as, for example, microphones (with speech recognition hardware and software), keyboards, etc.

The processor 44 is operatively connected to the battery 30 and is configured to determine the amount of energy in the battery 30 that is available to propel the vehicle 10 through the application of torque by motor 26. For example, the processor 44 may estimate the amount of energy stored within the battery 30 based on the state of charge of the battery 30. The processor 44 determines the amount of available energy in the battery 30 at step 60.

Figures 4, 5:
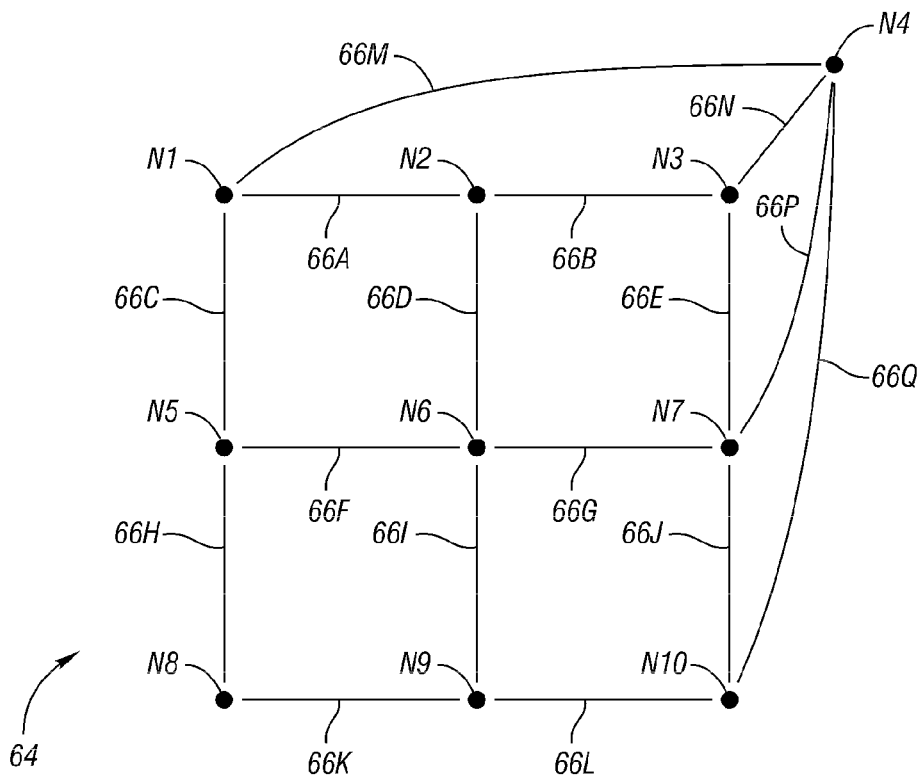
FIG. 4 is a schematic depiction of a road network.
FIG. 5 is a table displaying data describing the road network of FIG. 4.

At step 62, the processor 44 accesses a map database that is stored on the data storage medium 54 and that describes a road network. An exemplary portion of a road network is shown at 64 in FIG. 4. Referring to FIG. 4, the road network 64 includes a plurality of roads 66A-Q, each of which extends between two nodes N1-N10. Each node N1-N10 interconnects at least three of the roads 66A-Q, and thus represents a point at which a route can change. For example, a vehicle 10 travelling on road 66M is committed to continuing on road 66M until the vehicle reaches either node N1 or N4. At node N1, the vehicle 10 on road 66M and may take either road 66C or road 66A. Exemplary nodes include intersections, junctions, etc.

The map database includes data describing the road network 64 and its attributes, including geographic attributes such as the locations of the roads 66A-Q and nodes N1-N10. Road names and street addresses, as well as latitude and longitude, are also encoded as part of the map database. Referring to FIG. 5, the map database also includes, for each of the roads 66A-Q, a respective attribute value which, in the embodiment depicted, is estimated travel time. The estimated travel time of each road is an estimate of the amount of time a vehicle will take to travel the length of the road, and may be based on a variety of factors, such as the legal speed limit of the road, the average traffic congestion of the road, etc.

The map database also includes, for each of the roads 66A-Q, a respective energy cost. The estimated energy cost of each road is an estimate of the amount of energy in the battery 30 that is expended to propel the vehicle 10 along the length of the road, and may be based on a variety of factors, such as the legal speed limit of the road, the average traffic congestion of the road (e.g., the amount of start and stop operation), the condition of the road (e.g., paved or unpaved), the topography of the road (uphill, downhill, etc). It should be noted that the estimated energy cost may be vehicle-specific because different models of vehicles will require different amounts of energy to be propelled the length of a road. Accordingly, the estimated energy usages may also be based on factors such as the mass of the vehicle 10, the coefficient of drag of the vehicle 10, etc.

It should be noted that the estimated travel time of a road and the estimated energy cost of a road may vary with the direction of travel on the road. Accordingly, and within the scope of the claimed invention, the map database may include for each road two estimated travel times and two estimated energy costs, with one of the estimated travel times and one of the estimated energy usages being for travel in one direction and the other of the estimated travel times and estimated energy usages being for travel in the other direction. Other variations of road attribute data may be employed within the scope of the claimed invention.

Figures 6, 7:
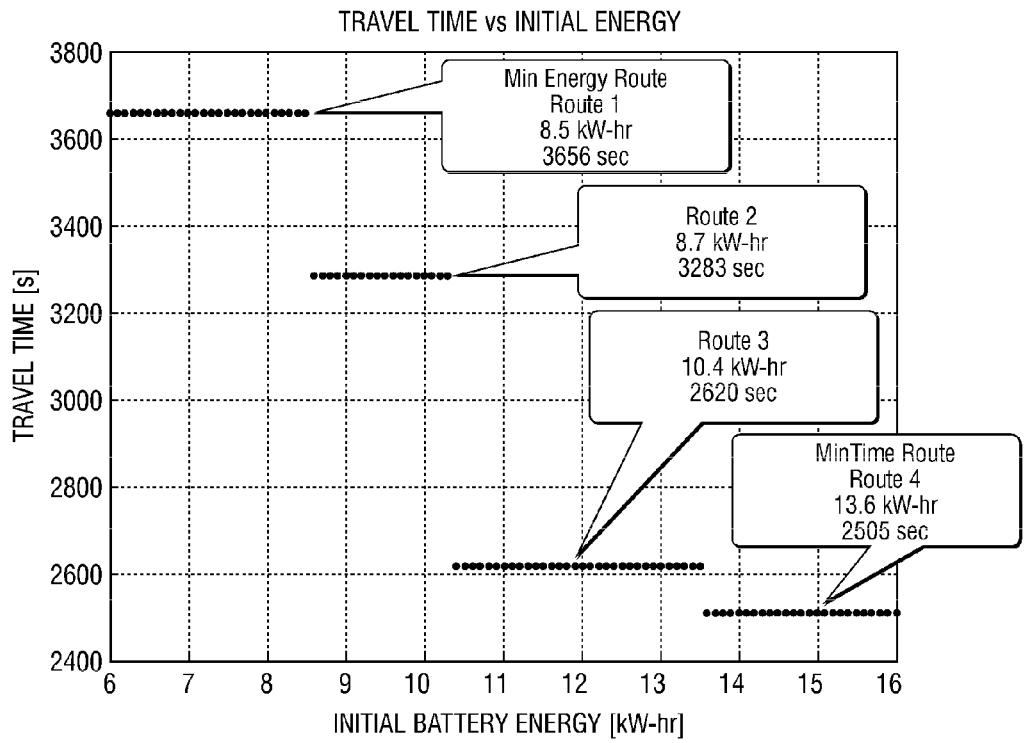
FIG. 6 is a table depicting the interconnections in the road network of FIG. 4.
FIG. 7 is a graph depicting the dependence of route selection by the navigation system on battery charge.

The map database also includes the information shown in the matrix of FIG. 6. Referring to FIG. 6, the matrix depicts whether two nodes are directly connected by a road, and, if so, by which road. Thus, for example, node N4 and node N10 are connected by road 66Q.

Referring again to FIGS. 2 and 3, the processor 44 performs an optimization analysis of the map database at step 70 to determine a route from the starting location received at step 56 to the destination received at step 58. The road network 64 defines a plurality of possible routes that the vehicle 10 may travel from the starting location to the destination. For example, if the vehicle 10 is at node N1 (i.e., if the starting location received at step 56 is node N1), and the driver of the vehicle 10 desires to travel to node N10 (i.e., the destination received at step 58 is node N10), one possible route comprises road 66C, node N5, road 66H, node N8, road 66K, node N9, and road 66L. Another possible route comprises road 66M, node N4, road 66P, node N7, and road 66J.

The possible routes are comprised of roads and/or portions thereof, and thus roads 66A-Q are route segments. A route's attribute value is therefore the sum of the attribute values of the route segments that comprise the route. For example, the estimated travel time of the route comprised of roads 66C, 66H, 66K, and 66L is the sum of the estimated travel times if roads 66C, 66H, 66K, and 66L, i.e., 4,112 seconds.

At step 70, the processor 44 determines whether any of the possible routes from the starting location to the destination may be completed using only the energy in the battery 30; of the routes that may be completed using only the energy in the battery, the processor 44 selects that route having the optimal, i.e., maximized or minimized, attribute value, which, in the embodiment depicted, is estimated travel time.

The analysis at step 70 may include a parsimony function that eliminates nodes that are unlikely to be touched by any feasible route. An exemplary parsimony function is to estimate the diameter of a circle enclosing a convex hull about the starting location, destination, and way points for the trip. Any node in the directed graph that is outside this circle and more than a radius away from any point selected for the trip is removed. Thus, for example, the road network 64 may comprise all the public roads in a large geographic region, and the parsimony function may reduce the relevant roads and nodes to those shown in FIG. 4.

In the embodiment depicted, the optimization analysis includes a shortest-path constrained optimization problem expressed mathematically as:

$$u^* \in \begin{cases} \operatorname{argmin}_{u_1, u_2 \ldots}, \sum_{k=1}^{\infty} t(x_k, u_k) \\ \text{subject to} \\ u_k \in U(x_k) \\ \sum_{k=1}^{\infty} c(x_k, u_k) \leq D \end{cases} \quad (\text{eq. 1})$$

where t(x, u) is the estimated travel time to travel from node x to node u, U(x) is a set that contains the feasible next nodes given the current node, c(x, u) is the estimated energy cost to travel from node x to node u, and D is the available energy in the battery (determined at step 60).

Equation 1 may be expressed as, of the routes that belong to the set of routes having an energy cost less than or equal to the amount of energy in the battery, that route having the lowest estimated travel time. In other words, the solution to equation 1 is, of the set of routes from the starting location to the predetermined destination having a total estimated energy cost that is sufficiently low such that the vehicle can complete any one of routes in the set using only the energy in the battery, the route having the lowest (optimal) estimated travel time.

The optimization in equation 1 can be solved by many different methods. However, for problems of any reasonable scale, direct solution of equation 1 using typical solution methods such as gradient or global searches is not feasible because of memory and time requirements. Therefore, the exemplary embodiment is based on converting equation 1, a constrained dynamic program, into a linear program.

This optimization problem is solved by the processor 44 using modified dynamic programming equations reformulated as a linear program:

$$\varphi(x_1) = \begin{cases} \operatorname{argmax}_{\varphi, \lambda}(\varphi(x_1) - \lambda \cdot D) \\ \text{subject to} \\ \varphi(x) \leq t(x, u) + \lambda \cdot c(x, u) + \varphi(u), \forall x, \{u \mid u \in U(x)\} \\ \lambda \geq 0 \end{cases} \quad (\text{eq. 2})$$

In this equation, two intermediate variables are introduced to aid in solution. The variable phi is a vector and each element in that vector corresponds to a node in the map. The notation phi(x) indicates the value of phi associated with node x. The variable lambda is a scalar value. A linear program is usually expressed as minimization problem with a linear objective subject to a linear set of inequalities:

$$\begin{cases} \min_{x} c^T \cdot x \\ \text{s.t.} \\ A \cdot x \leq b \end{cases} \quad (\text{eq. 3})$$

The vector c is set equal to $$x = \begin{bmatrix} 1 \\ 1 \\ \vdots \\ 1 \\ -D \end{bmatrix} \quad (\text{eq. 4})$$

and the optimization variables are equal to $$x = \begin{bmatrix} \varphi(x_1) \\ \varphi(x_2) \\ \vdots \\ \varphi(x_N) \\ \lambda \end{bmatrix} \quad (\text{eq. 5})$$

The matrix A and the vector b are found by explicitly solving for the constraints in equation 2 in terms of phi and lambda, then converting the results into a linear inequality. There is one row in A for each combination of nodes in the map and destination nodes. For example at a 4 way intersection, there are 4 possible destinations from that intersection. Therefore, there are 4 rows in the A matrix representing the 4 possible paths that can be taken.

Since it is possible for a linear program to be infeasible, any algorithm needs to address what to do if no feasible path exists which satisfies the battery constraints. For the exemplary solution, if a battery constraint eliminates all feasible constraints, then the minimum energy solution is used. Those familiar with the art will recognize that many alternative paths can be chosen.

If a solution to this problem exists, then the optimal route is found by:

$$u^*(x) \in \begin{cases} \operatorname{argmin}_{u \in U(x)} c(x, u) \\ \text{subject to} \\ |t(x, u) + \lambda \cdot c(x, u) + \varphi(u)| < \varepsilon \end{cases} \quad (\text{eq. 6})$$

where ϵ is a small value that allows for numerical noise. Other optimization techniques may be employed within the scope of the claimed invention.

At step 74, the processor 44 inquires whether there is a solution to equation 2, i.e., whether the set of routes having an energy cost less than or equal to the amount of energy in the battery has at least one member. If the answer to the inquiry at step 74 is yes, then the processor 44 communicates the solution to equation 6 to the driver of the vehicle 10 via an output device, such as the touch-screen display 52, at step 78. In an exemplary embodiment, the touch-screen display includes a liquid crystal display (LCD). Other output devices, such as audio speakers, may be used in conjunction with, or instead of, display 52 within the scope of the claimed invention.

Those skilled in the art will recognize a variety of different formats for communicating the solution to equation 6 to the driver of the vehicle at step 78, such as a list of driving instructions, a map highlighting the solution, etc. In an exemplary embodiment, the solution is communicated over time, with driving instructions provided on a "turn by turn" basis as the vehicle progresses along the route that comprises the solution.

The navigation system 42 thus facilitates the use of the vehicle 10 to accomplish the objective of the driver (i.e., to reach the desired destination via the route having an optimal attribute value) in a manner than minimizes or eliminates the consumption of fuel for the engine 34.

For example, if the starting location received at step 56 is node N1, and the destination received at step 58 is node N10, equation 2 is converted into a linear program:

$$(\varphi, \lambda) = \begin{cases} \text{argmax}_{\varphi(1),\lambda(2),\ldots,\varphi(10),\lambda}(\varphi(1) - \lambda \cdot D) \\ \text{subject to} \\ \varphi(1) \leq T_{1,m} + \lambda \cdot C_{1,m} + \varphi(m), \forall \{m \mid P_{1,m}\} \\ \varphi(2) \leq T_{2,m} + \lambda \cdot C_{2,m} + \varphi(m), \forall \{m \mid P_{2,m}\} \\ \vdots \\ \varphi(10) \leq T_{10,m} + \lambda \cdot C_{10,m} + \varphi(m), \forall \{m \mid P_{10,m}\} \end{cases} \quad (\text{eq. 7})$$

This linear program is solved for ϕ and λ. Using the algorithm in equation 6 the optimal route is found.

The effects of this algorithm can be seen by sweeping the value of D (i.e., the energy in the battery) from 0 to 16 kilowatt-hours. For this road network 64, four viable routes are found, i.e., there are four possible routes in the road network 64 that connect node N1 and node N10 and that have a total energy cost of less than 16 kilowatt-hours. Thus, the vehicle 10 can travel from node N1 to node N10 using any one of these four routes and use less than 16 kilowatt hours of energy from the battery 30 to do so.

One of the four routes ("Route 1") includes road 66C, node N5, road 66F, node N6, road 66I, node N9, and road 66L. The estimated travel time for Route 1 is the sum of the respective travel times for the roads 66C, 66F, 66I, and 66L (or any portions thereof) that comprise Route 1. Thus, the total estimated travel time for Route 1 is 3656 seconds. The total estimated energy cost of Route 1 is the sum of the respective energy costs for the roads 66C, 66F, 66I, and 66L (or any portions thereof) that comprise Route 1. Thus, the total energy cost of Route 1 is 8.5 kilowatt-hours.

Another of the four routes ("Route 2") includes road 66C, node N5, road 66, node N6, road 66G, node N7, and road 66J. The total estimated travel time for Route 2 is the sum of the respective travel times for the roads 66C, 66F, 66G, and 66J (or any portions thereof) that comprise Route 2. Thus, the total estimated travel time for Route 2 is 3283 seconds. The total estimated energy cost of Route 2 is the sum of the respective energy costs for the roads 66C, 66F, 66G, and 66J (or any portions thereof) that comprise Route 2. Thus, the total energy cost of Route 2 is 8.7 kilowatt-hours.

Yet another of the four routes ("Route 3") includes road 66A, node N2, road 66B, node N3, road 66E, node N7, and road 66J. The total estimated travel time for Route 3 is the sum of the respective travel times for the roads 66A, 66B, 66E, and 66J (or any portions thereof) that comprise Route 3. Thus, the total estimated travel time for Route 3 is 2620 seconds. The total estimated energy cost of Route 3 is the sum of the respective energy costs for the roads 66A, 66B, 66E, and 66J (or any portions thereof) that comprise Route 3. Thus, the total energy cost of Route 3 is 10.4 kilowatt-hours.

Yet another of the four routes ("Route 4") includes road 66M, node N4, road 66P, node N7, and road 66J. The total estimated travel time for Route 4 is the sum of the respective travel times for the roads 66M, 66P, and 66J (or any portions thereof) that comprise Route 4. Thus, the total estimated travel time for Route 4 is 2505 seconds. The total estimated energy cost of Route 4 is the sum of the respective energy costs for the roads 66M, 66P, and 66J (or any portions thereof) that comprise Route 4. Thus, the total energy cost of Route 4 is 13.6 kilowatt-hours.

Thus, the four routes provide a range of travel times and energy costs for the vehicle 10 to travel from node N1 (the starting location) to node N10 (the destination). A driver typically desires the route that has the lowest total travel time. However, in a vehicle 10 having a hybrid powertrain 22, the driver may also want to avoid use of the engine 34, i.e., use only the energy available in the battery 30. Accordingly, the navigation system 42 determines which of the routes defined by the road network can be completed using only the energy available in the battery, and of those routes, which has the lowest total estimated travel time.

Route 1 is the minimum energy route: the route that uses the least amount of energy to move from the starting location to the destination. Route 4 is the minimum-time route: the route that takes the least amount of time to get to the destination.

Referring to FIGS. 2 and 7, if the amount of energy stored in the battery 30 is at least 13.6 kilowatt-hours, then the vehicle 10 can complete any of Routes 1-4 using only the energy stored in the battery 30. In other words, Routes 1-4 belong to the set of routes from the starting location to the predetermined destination having a total estimated energy cost that is sufficiently low such that the vehicle can complete any one of routes in the set using only the energy in the battery. However, since Route 4 has the lowest total estimated travel time, the processor 44 communicates route 4 to the touch-screen display 52.

If the amount of energy stored in the battery 30 is less than 13.6 kilowatt-hours, then the vehicle 10 cannot complete Route 4 without using the engine 34. If the amount of energy stored in the battery 30 less than 13.6 kilowatt-hours, but is is at least 10.4 kilowatt-hours, then the vehicle 10 can complete any of Routes 1-3 using only the energy stored in the battery 30. That is, Routes 1-3 belong to the set of routes from the starting location to the predetermined destination having a total estimated energy cost that is sufficiently low such that the vehicle can complete any one of routes in the set using only the energy in the battery. Since Route 3 has the lowest total estimated travel time of Routes 1-3, then the processor 44 communicates Route 3 to the touch-screen display if the amount of energy in the battery 30 is between 10.4 kilowatt-hours and 13.6 kilowatt-hours.

If the amount of energy stored in the battery 30 is less than 10.4 kilowatt-hours, then the vehicle 10 cannot complete either Route 4 or Route 3 without using the engine. If the amount of energy stored in the battery 30 is less than 10.4 kilowatt-hours, but is at least 8.7 kilowatt-hours, then the vehicle 10 can complete either of Routes 1 and 2 using only the energy stored in the battery 30. That is, Routes 1 and 2 belong to the set of routes from the starting location to the predetermined destination having a total estimated energy cost that is sufficiently low such that the vehicle can complete any one of routes in the set using only the energy in the battery. Since the total estimated travel time of Route 2 is less than the total estimated travel time of Route 1, the processor 44 communicates Route 2 to the touch-screen display if the amount of energy in the battery 30 is between 8.7 kilowatt-hours and 10.4 kilowatt-hours.

If the amount of energy stored in the battery 30 is less than 8.7 kilowatt-hours, then the vehicle 10 cannot complete Routes 2-4 without using the engine. If the amount of energy stored in the battery is less than 8.7 kilowatt-hours, but is at least 8.5 kilowatt-hours, then the only route from node N1 to node N10 that the vehicle 10 can complete using only the energy stored in the battery 30 is Route 1, and therefore the processor 44 communicates Route 1 to the touch-screen display. That is, the set of routes that have a total estimated energy cost that is sufficiently low such that the vehicle can complete any one of routes in the set using only the energy in the battery includes only Route 1.

If the answer to the inquiry at step 74 is no, that is, if there is not a solution to equation 2 and thus there no routes in the set, then the processor 44 determines which of the routes from the starting location to the ending location has the lowest total energy cost at step 82.

More specifically, in the embodiment depicted the processor 44 performs step 82 by solving the following equation:

$$u^* \in \begin{cases} \text{argmin}_{u_1, u_2, \ldots}, \sum_{k=1}^{\infty} c(x_k, u_k) \\ \text{subject to} \\ u_k \in U(x_k) \end{cases} \quad \text{(eq. 8)}$$

The processor 44 solves equation 8 using dynamic programming. First, the "value" function is found using $$V^*(x) = \min_{u \in U(x)} \{c(x,u) + V(u)\} \quad \text{(eq. 9)}$$

Equation 9 solves for the minimum cost of travel from each node in the graph. To find the optimal routing, the processor 44 uses $$u^*(x) = \text{argmin}_{u \in U(x)} \{c(x,u) + V(u)\} \quad \text{(eq. 10)}$$

The processor 44 determines the route by recursively solving equation 10 using $$u_k^* = \begin{cases} x_1, & \text{if } k == 1 \\ \text{argmin}_{u \in U(x)} \{c(u_{k-1}^*, u) + V(u)\}, & \text{otherwise} \end{cases} \quad \text{(eq. 11)}$$

For example, if the starting location is node N1 and the destination location is node N10, the processor 44 solves the problem expressed by equation 6 by converting it into a linear program:

$$V = \begin{cases} \max_{V(1), V(2), \ldots, V(10)} \left( \sum_{k=1}^{10} V(k) \right) \\ \text{subject to} \\ V(1) \leq C_{1,m} + V(m), \forall \{m \mid P_{1,m}\} \\ V(2) \leq C_{2,m} + V(m), \forall \{m \mid P_{2,m}\} \\ \vdots \\ V(10) \leq C_{10,m} + V(m), \forall \{m \mid P_{10,m}\} \end{cases} \quad \text{(eq. 12)}$$

Solving this problem yields the following value function for each node:

$$V = [8.5\ 7.8\ 5.2\ 6.1\ 6.4\ 4.4\ 2.6\ 4.8\ 2.4\ 0.0] \quad \text{(eq. 13)}$$

Using this value function, the resulting route is $u^* = (1, 5, 6, 9, 10)$. That is, the route having the lowest total estimated energy cost from node N1 to node N10 is node N1 to node N5 to node N6 to node N9 to node N10, which corresponds to Route 1. Referring again to FIG. 7, if the energy in the battery is less than 8.5 kilowatt-hours, then the processor 44 communicates Route 1 to the touch-screen display 52. Although the vehicle 10 must use the engine 34 to complete Route 1 if the amount of energy in the battery 30 is less than 8.5 kilowatt-hours, Route 1 minimizes total energy use of the vehicle 10 in travelling from node N1 to node N10.

In the embodiment depicted, the map database stores a single energy cost value and a single estimated travel time value for each road; however, and within the scope of the claimed invention, the estimated travel times and the estimated energy costs may be stored in any format within the scope of the claimed invention, such as look-up tables, formulae, etc.

In the embodiment depicted, the energy costs stored in the map database are the amounts of energy that will be depleted from the battery 30, and thus the energy costs take into account inefficiencies inherent in the conversion of energy in the powertrain 22. However, other measures of energy cost may be employed within the scope of the claimed invention. For example, and within the scope of the claimed invention, the map database may store energy costs as the theoretical energy costs for the vehicle 10 to travel, and the processor 44 would adjust these theoretical energy costs to accommodate for any powertrain inefficiencies. Similarly, energy costs may be unitless factors that may be applicable to any vehicle; the processor 44 would convert or otherwise adjust the unitless factors to take into account the efficiency of the powertrain 22, the mass of the vehicle 10, the coefficient of drag of the vehicle 10, the rolling resistance of the vehicle, etc. to convert the unitless factors to the amount of energy that will be depleted from the battery 30.

In the embodiment shown, the map database includes an estimated energy cost for each of the route segments, as shown in the table in FIG. 5. However, and within the scope of the claimed invention, the processor 44 may use other road attribute data within the map database in conjunction with characteristics of the vehicle 10 to determine estimated energy costs. For example, if a map database does not include an estimated energy cost for a route segment, but does include an average vehicle velocity (or speed limit) and length for the route segment, then the processor may determine an estimated energy cost for the route segment by using characteristics of the vehicle 10, such as the coefficient of drag, rolling resistance, mass, and powertrain efficiency, to determine the energy cost of propelling the vehicle 10 the length of the route segment at the average vehicle velocity of the route segment. Thus, the navigation system 432 may employ a pre-existing map database that does not include energy costs. It should be noted that, in the embodiment depicted, the speed of travel on a route segment may be determined by dividing the length of the route segment by the estimated travel time of the route segment.

It should be noted that, in the context of the claimed invention, a "processor" may include a plurality of processors that cooperate to perform the operations described herein.

Those skilled in the art will recognize a variety of data storage media that may be employed within the scope of the claimed invention. For example, data storage medium 54 may be a hard drive, read-only memory, writable read-only memory, optical media such as a compact disk, etc.

It should be noted that, although all of the components of the navigation system 42 are shown onboard vehicle 10, some or all of the components of the navigation system 42 may be offboard the vehicle within the scope of the claimed invention. For example, and within the scope of the claimed invention, the processor 44 and the data storage medium 54 may be offboard the vehicle 10 at a remote location; a wireless communication system, such as a satellite relay system, may operatively connect the processor 44 to the GPS, the touchscreen display, the battery, etc.

It should be noted that, in the context of the claimed invention, a "data storage medium" may include multiple storage media. For example, and within the scope of the claimed invention, the map database may be distributed over two or more data storage media.

While the best modes for carrying out the invention have been described in detail, those familiar with the art to which this invention relates will recognize various alternative designs and embodiments for practicing the invention within the scope of the appended claims.

The invention claimed is:

1. A system for selecting a route from a starting location to a predetermined destination, comprising:
a vehicle having a battery;
a storage medium having a map database describing a road network comprising route segments that define a plurality of possible routes from the starting location to the predetermined destination; said route segments being characterized by an attribute and an energy cost; said map database including, for each of the route segments, a respective value for the attribute;
a processor operatively connected to the battery and configured to determine the amount of available energy stored in the battery, and operatively connected to the storage medium and configured to selectively access the map database;
said processor being configured to determine whether any of the possible routes belong to a set of routes from the starting location to the predetermined destination having a total energy cost that is sufficiently low such that the vehicle can complete any one of the routes in the set using only the energy in the battery; and
said processor being configured to select, of the possible routes belonging to the set, that route having an optimal value for the attribute.

2. The system of claim 1, wherein the attribute is estimated travel time.

3. The system of claim 2, further comprising an output device operatively connected to the processor; and wherein the processor is configured to communicate the route having an optimal value for the attribute to the output device.

4. The system of claim 3, wherein the processor is configured such that, if the set is empty, the processor communicates to the output device which of the possible routes has the lowest energy cost.

5. The system of claim 1, wherein the vehicle includes a plurality of wheels and a powertrain having an electric motor and an engine;
wherein the electric motor is operatively connected to the battery to receive energy therefrom and operatively connected to at least one of the wheels to transmit torque thereto; and
wherein the engine is operatively connected to at least one of the wheels to selectively transmit energy thereto.

6. The system of claim 1, further comprising a user-operable input device configured to communicate the predetermined destination to the processor.

7. The system of claim 1, further comprising a vehicle-location detection device configured to communicate the location of the vehicle to the processor.

8. The system of claim 1, wherein the processor is configured to determine the energy cost of a route segment from the attribute value of the route segment and characteristics of the vehicle.

9. The system of claim 1, wherein the map database includes the energy costs of the route segments.

10. A method of determining an optimized route for a vehicle to travel from a starting location to a predetermined destination, the method comprising:
receiving the starting location;
receiving the predetermined destination;
determining the amount of available energy in a battery in the vehicle;
accessing a map database that describes a road network having route segments that define a plurality of possible routes from the starting location to the predetermined destination; said route segments being characterized by an attribute and an energy cost; said map database including, for each of the route segments, a respective value for the attribute;
determining by a processor whether any of the possible routes belong to a set of routes that have a total estimated energy cost that is sufficiently low such that the vehicle can complete any one of the routes in the set using only the energy in the battery; and
of the possible routes belonging to the set, determining that route having an optimized value for the attribute.

11. The method of claim 10, further comprising communicating the route having an optimized value for the attribute to an output device.

12. The method of claim 11, further comprising communicating to the output device which of the possible routes has the lowest energy cost if the set is empty.

13. The method of claim 10, further comprising determining the energy cost of at least one of the route segments from the attribute value of said at least one of the route segments and from characteristics of the vehicle.

14. The method of claim 10, wherein the map database includes the energy costs of the route segments.

* * * * *